(12) United States Patent
Guha et al.

(10) Patent No.: US 11,978,434 B2
(45) Date of Patent: May 7, 2024

(54) DEVELOPING AN AUTOMATIC SPEECH RECOGNITION SYSTEM USING NORMALIZATION

(71) Applicant: Microsoft Technology Licensing, LLC, Redmond, WA (US)

(72) Inventors: Satarupa Guha, Kolkata (IN); Ankur Gupta, Hyderabad (IN); Rahul Ambavat, Pali (IN); Rupeshkumar Rasiklal Mehta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 17/488,695

(22) Filed: Sep. 29, 2021

(65) Prior Publication Data

US 2023/0094511 A1  Mar. 30, 2023

(51) Int. Cl.
*G10L 15/26* (2006.01)
*G10L 15/06* (2013.01)

(52) U.S. Cl.
CPC .............. *G10L 15/06* (2013.01); *G10L 15/26* (2013.01)

(58) Field of Classification Search
CPC ...................................................... G10L 15/26
USPC ......................................................... 704/231
See application file for complete search history.

(56) References Cited

U.S. PATENT DOCUMENTS

| | | | |
|---|---|---|---|
| 9,292,489 B1 | 3/2016 | Sak et al. | |
| 9,741,339 B2* | 8/2017 | Peng | G10L 13/08 |
| 11,587,569 B2* | 2/2023 | Ye | G10L 15/063 |
| 2015/0006178 A1* | 1/2015 | Peng | G10L 15/18 704/254 |
| 2015/0254233 A1* | 9/2015 | Artzi | G06F 40/216 704/9 |
| 2019/0318742 A1* | 10/2019 | Srivastava | G10L 15/32 |
| 2020/0160836 A1 | 5/2020 | Chen et al. | |
| 2023/0102338 A1 | 3/2023 | Ambavat et al. | |
| 2023/0274730 A1* | 8/2023 | Fantinuoli | G10L 15/26 |

OTHER PUBLICATIONS

Interacting With Computers by Voice: Automatic Speech Recognition and Synthesis Douglas O'Shaughnessy, Senior Member, IEEE, 2019 (Year: 2018).*

(Continued)

*Primary Examiner* — Bharatkumar S Shah

(57) ABSTRACT

A computer-implemented technique identifies terms in an original reference transcription and original ASR output results that are considered valid variants of each other, even though these terms have different textual forms. Based on this finding, the technique produces a normalized reference transcription and normalized ASR output results in which valid variants are assigned the same textual form. In some implementations, the technique uses the normalized text to develop a model for an ASR system. For example, the technique may generate a word error rate (WER) measure by comparing the normalized reference transcription with the normalized ASR output results, and use the WER measure as guidance in developing the model. Some aspects of the technique involve identifying occasions in which a term can be properly split into component parts. Other aspects can identify other ways in which two terms may vary in spelling, but nonetheless remain valid variants.

18 Claims, 9 Drawing Sheets

(56) References Cited

OTHER PUBLICATIONS

Automatic Speech Recognition, IEEE, 2015 (Year: 2015).*
Nteracting With Computers by Voice: Automatic Speech Recognition and Synthesis Douglas O'Shaughnessy, Senior Member, IEEE, 2019 (Year: 2018) (Year: 2018).*
Douglas O'Shaughnessy, "Automatic Speech Recognition," in Speech Communications: Human and Machine , IEEE, 2000, pp. 367-435, doi: 10.1109/9780470546475.ch10. (Year: 2000).*
"Byte pair encoding," available at https://en.wikipedia.org/wiki/Byte_pair_encoding, Wikipedia entry, accessed on Aug. 26, 2021, 2 pages.
Creutz, et al., "Unsupervised Discovery of Morphemes," in Morphological and Phonological Learning: Proceedings of the 6th Workshop of the ACL Special Interest Group in Computational Phonology (SIGPHON), Association for Computational Linguistics, Jul. 2002, pp. 21-30.
Smit, et al., "Morfessor 2.0: Toolkit for statistical morphological segmentation," in Proceedings of the Demonstrations at the 14th Conference of the European Chapter of the Association for Computational Linguistics, Association for Computational Linguistics, Apr. 2014, pp. 21-24.
Wu, et al., "Google's Neural Machine Translation System: Bridging the Gap between Human and Machine Translation," arXiv: 1609.08144v2 [cs.CL], Oct. 8, 2016, 23 pages.
"Gujrati Grammar," available at https://en.wikipedia.org/wiki/Gujarati_grammar, Wikipedia entry, accessed on Aug. 23, 2021, 9 pages.
"Schwa," available at https://en.wikipedia.org/wiki/Schwa, Wikipedia entry, accessed on Aug. 23, 2021, 8 pages.
Huang, et al., "An Overview of Modern Speech Recognition," available at https://www.microsoft.com/en-us/research/publication/an-overview-of-modern-speech-recognition/, in Handbook of Natural Language Processing, 2nd Edition, 2010, Chapman and Hall/CRC, Chapter 15, 29 pages.
Kudo, et al., "SentencePiece: A simple and language independent subword tokenizer and detokenizer for Neural Text Processing," arXiv:1808.06226v1 [cs.CL], Aug. 19, 2018, 6 pages.
Sennrich, et al., "Neural Machine Translation of Rare Words with Subword Units," arXiv:1508.07909v5 [cs.CL], Jun. 10, 2016, 11 pages.
"Microsoft Translator," available at https://en.wikipedia.org/wiki/Microsoft_Translator, Wikipedia entry, accessed on Sep. 30, 10 pages.
Ambavat, et al., "Enhancing ASR System Performance for Agglutinative Languages," U.S. Appl. No. 17/488,661, filed Sep. 29, 2021, 50 pages.
Joshi, et al., "Design and Evaluation of Devanagari Virtual Keyboards for Touch Screen Mobile Phones," in Proceedings of the 13th International Conference on Human Computer Interaction with Mobile Devices and Services, Aug. 2011, pp. 323-332.
Shah, et al., "Cross-lingual and Multilingual Spoken Term Detection for Low-resource Indian Languages," arXiv e-print, arXiv:2011.06226v1 [cs.CL], Nov. 12, 2020, 5 pages.
Ameta, et al., "A Lightweight Stemmer for Gujarati," arXiv e-print, arXiv:1210.5486v2 [cs.CL], Nov. 11, 2012, 4 pages.
Hasan, et al., "Spelling Correction of User Search Queries Through Statistical Machine Translation," in Proceedings of the 2015 Conference on Empirical Methods in Natural Language Processing, Sep. 2015, pp. 451-460.
Wilbur, et al., "Spelling Correction in the Submed Search Engine," in Information Retrieval, vol. 9, No. 5, Nov. 2006, 31 pages.
Ahmad, et al., "Learning a Spelling Error Model from Search Query Logs," in Proceedings of the Conference on Human Language Technology and Empirical Methods in Natural Language Processing, HLT '05, Oct. 2015, pp. 955-962.
Etoori, et al., "Automatic Spelling Correction for Resource-scarce Languages Using Deep Learning," in Proceedings of ACL 2018, Student Research Workshop, Jul. 2018, pp. 146-152.
Chaudhuri, Bidyut Baran, "Towards Indian Language Spell-checker Design," in Proceedings of Language Engineering Conference, 2002, 8 pages.
Dixit, et al., "Design and implementation of a morphology-based Spellchecker for Marathi, an Indian Language," in Archives of Control Sciences, vol. 15, 2005, pp. 251-258.
Rao, et al., "Telugu Spell Checker," available at http://sanskrit.uohyd.ac.in/faculty/amba/PUBLICATIONS/papers/ITIC-ss.pdf, Center for Applied Linguistics and Translation Studies at University of Hyderabad, 2012, accessed on Oct. 6, 2021, 8 pages.
Sharma, et al., "Hindi Spell Checker," available at https://cse.jitk.ac.in/users/cs365/2013/submissions/~pulkitj/cs365/project/report.pdf, Indian Institute of Technology Kanpur, Apr. 17, 2013, 7 pages.
Kaur, et al., "Design and Implementation of HINSPELL—Hindi Spell Checker using Hybrid Approach," in International Journal of Scientific Research and Management (IJSRM), vol. 3, No. 2, pp. 2058-2061.
Emond, et al., "Transliteration Based Approaches to Improve Code-switched Speech Recognition Performance," in IEEE Spoken Language Technology Workshop (SLT), 2018, 8 pages.
Singh, et al., "Automatic Normalization of Word Variations in Code-Mixed Social Media Text," arXiv e-prints, arXiv: 1804.00804v1 [cs.CL], Apr. 2018, 11 pages.
Pandey, et al., "Improving Speech Recognition of Compound-rich Languages," in Proceedings of Interspeech, Oct. 2020, 5 pages.
Smit, et al., "Improved subword modeling for WFST-based speech recognition," in Proceedings of Interspeech, 2017, pp. 2551-2555.
Office Action in U.S. Appl. No. 17/488,661, dated Dec. 20, 2023, 6 pages.
Guha, et al., "Unsupervised Language-agnostic WER Standardization," arXiv, arXiv:2303.05046v1 [cs.CL], Mar. 2023, 5 pages.

* cited by examiner

OVERVIEW OF OPERATION OF THE NORMALIZING COMPONENT 602

OBTAIN A SAMPLE UTTERANCE AND AN ORIGINAL REFERENCE TRANSCRIPTION OF THE SAMPLE UTTERANCE, FOR USE IN DEVELOPING THE MODEL.
604

CONVERT THE SAMPLE UTTERANCE TO ORIGINAL ASR OUTPUT RESULTS USING THE ASR SYSTEM, THE ORIGINAL REFERENCE TRANSCRIPTION HAVING AT LEAST ONE ORIGINAL REFERENCE TERM THAT IS CONSIDERED TO BE A VALID VARIANT OF A CORRESPONDING ORIGINAL ASR TERM IN THE ORIGINAL ASR OUTPUT RESULTS, WHEREIN THE ORIGINAL REFERENCE TERM HAS A DIFFERENT TEXTUAL FORM THAN THE ORIGINAL ASR TERM.
606

PRODUCE A NORMALIZED REFERENCE TRANSCRIPTION AND NORMALIZED ASR OUTPUT RESULTS, THE NORMALIZED REFERENCE TRANSCRIPTION HAVING A NORMALIZED REFERENCE TERM THAT IS A COUNTERPART OF THE ORIGINAL REFERENCE TERM, AND THE NORMALIZED ASR OUTPUT RESULTS HAVING A NORMALIZED ASR TERM THAT IS A COUNTERPART OF THE ORIGINAL ASR TERM, THE NORMALIZED REFERENCE TERM HAVING A SAME TEXTUAL FORM AS THE NORMALIZED ASR TERM. THIS BLOCK RELIES ON AT LEAST ONE MACHINE-TRAINED RESOURCE THAT HAS BEEN DEVELOPED TO SERVE PLURAL FUNCTIONS, E.G., OTHER THAN NORMALIZING TEXT.
608

DEVELOP THE MODEL BASED, AT LEAST IN PART, ON THE NORMALIZED REFERENCE TRANSCRIPTION AND/OR THE NORMALIZED ASR OUTPUT RESULTS.
610

FIG. 6

OVERVIEW OF OPERATION OF THE NORMALIZING COMPONENT OF FIG. 4 (702)

OBTAIN A SAMPLE UTTERANCE AND AN ORIGINAL REFERENCE TRANSCRIPTION OF THE SAMPLE UTTERANCE.
704

CONVERT THE SAMPLE UTTERANCE TO ORIGINAL AUTOMATIC SPEECH RECOGNITION (ASR) OUTPUT RESULTS USING AN ASR PROCESS.
706

USE A SEGMENTATION ALGORITHM TO CONVERT AT LEAST ONE COMPOUND TERM THAT APPEARS IN THE ORIGINAL REFERENCE TRANSCRIPTION AND/OR THE ORIGINAL ASR OUTPUT RESULTS INTO A COMBINATION OF AT LEAST A FIRST SUB-TERM AND A SECOND SUB-TERM.
708

USE AT LEAST ONE VALIDITY TEST TO DETERMINE THAT IT IS APPROPRIATE TO SPLIT THE COMPOUND TERM INTO THE COMBINATION OF THE FIRST SUB-TERM AND THE SECOND SUB-TERM. THIS BLOCK RELIES ON AT LEAST ONE MACHINE-TRAINED RESOURCE THAT HAS BEEN DEVELOPED TO SERVE PLURAL FUNCTIONS, E.G., OTHER THAN NORMALIZING TEXT.
710

REPLACE EACH OCCURRENCE OF THE COMBINATION OF THE FIRST SUB-TERM AND THE SECOND SUB-TERM IN THE ORIGINAL REFERENCE TRANSCRIPTION AND THE ORIGINAL ASR OUTPUT RESULTS WITH THE COMPOUND TERM, TO PRODUCE A NORMALIZED REFERENCE TRANSCRIPTION AND NORMALIZED ASR OUTPUT RESULTS.
712

USE THE NORMALIZED REFERENCE TRANSCRIPTION AND/OR THE NORMALIZED ASR OUTPUT RESULTS TO IMPROVE PERFORMANCE OF A COMPUTER-IMPLEMENTED ASR APPLICATION.
714

FIG. 7

OVERVIEW OF OPERATION OF THE NORMALIZING COMPONENT FIG. 5 (802)

OBTAIN A SAMPLE UTTERANCE AND AN ORIGINAL REFERENCE TRANSCRIPTION OF THE SAMPLE UTTERANCE, FOR USE IN DEVELOPING THE LANGUAGE MODEL
804

CONVERT THE SAMPLE UTTERANCE TO ORIGINAL AUTOMATIC SPEECH RECOGNITION (ASR) OUTPUT RESULTS USING AN ASR PROCESS.
806

APPLY PLURAL CONVERSION PROCESSES TO EACH ORIGINAL REFERENCE TERM IN THE ORIGINAL REFERENCE TRANSCRIPTION, AND TO EACH ORIGINAL ASR TERM IN THE ORIGINAL ASR OUTPUT RESULTS, TO PRODUCE PLURAL CONVERSION RESULTS.
808

IDENTIFY AT LEAST ONE GROUP OF TERMS THAT ARE CONSIDERED VALID VARIANTS OF EACH OTHER, BASED ON THE PLURAL CONVERSION RESULTS. THIS BLOCK RELIES ON AT LEAST ONE MACHINE-TRAINED RESOURCE THAT HAS BEEN DEVELOPED TO SERVE PLURAL FUNCTIONS, E.G., OTHER THAN NORMALIZING TEXT.
810

SELECT A REPRESENTATIVE TERM FROM THE GROUP.
812

CONTINUED FROM FIG. 8

FOR EACH IDENTIFIED TERM IN THE ORIGINAL REFERENCE TRANSCRIPTION AND THE ORIGINAL ASR OUTPUT RESULTS THAT MATCHES A MEMBER OF THE GROUP OTHER THAN THE REPRESENTATIVE TERM, REPLACE THE IDENTIFIED TERM WITH THE REPRESENTATIVE TERM, THE OPERATION OF REPLACING PRODUCING A NORMALIZED REFERENCE TRANSCRIPTION AND NORMALIZED ASR OUTPUT RESULTS.
902

USE THE NORMALIZED REFERENCE TRANSCRIPTION AND/OR THE NORMALIZED ASR OUTPUT RESULTS TO IMPROVE PERFORMANCE OF A COMPUTER-IMPLEMENTED ASR APPLICATION.
904

FIG. 9

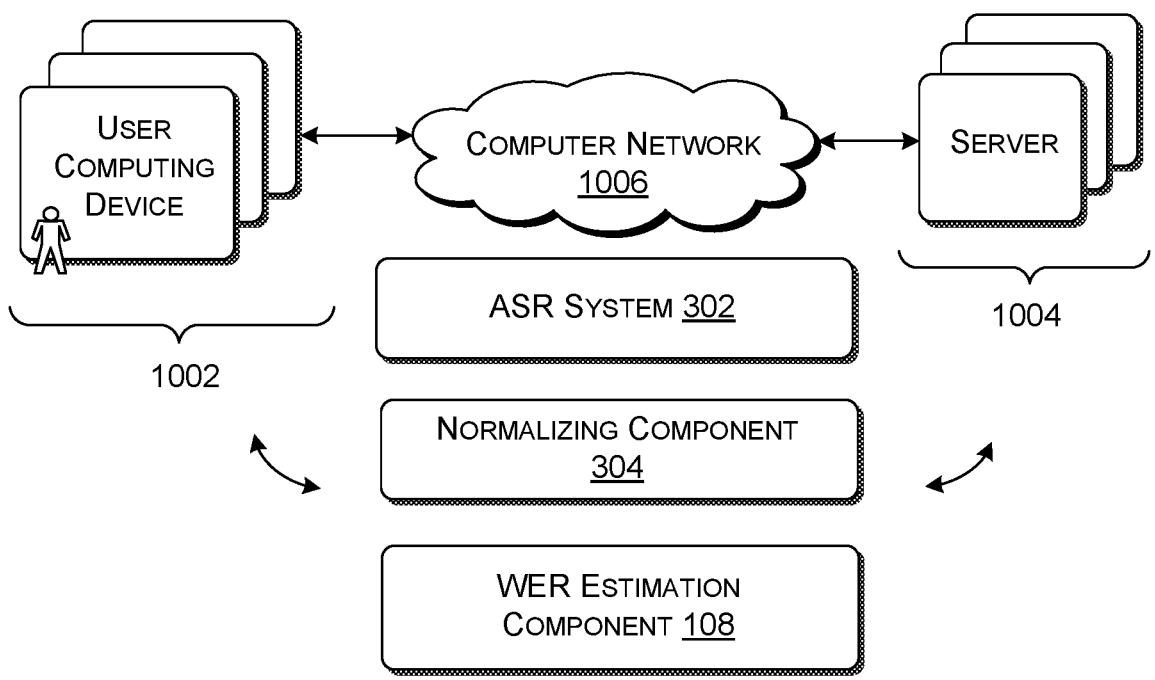

FIG. 10

DEVELOPING AN AUTOMATIC SPEECH RECOGNITION SYSTEM USING NORMALIZATION

BACKGROUND

A developer commonly produces a language model for automatic speech recognition (ASR) system in a development process that uses a word error rate (WER) measure. To compute WER for a sample utterance, the development process involves using the ASR model to transform the sample utterance into ASR output results. The development process then involves comparing a reference transcription of the sample utterance with the ASR output results. A favorable WER measure will occur when there are relatively few differences between the reference transcription and the ASR output results. In practice, however, the development process may be impacted by language-specific issues, which complicate the generation of an accurate WER measure. The failure to generate an accurate WER measure may also lead to the production of an inefficient language model for use in the ASR system.

SUMMARY

A computer-implemented technique is described herein for identifying terms in an original reference transcription and original ASR output results that are considered valid variants of each other, even though these terms have different textual forms. Based on this finding, the technique produces a normalized reference transcription and normalized ASR output results in which valid variants are assigned the same textual form. In some non-limiting implementations, the technique uses the normalized reference transcription and the normalized ASR output results to develop a processor-efficient and memory-efficient language model for an ASR system. "Normalization," as used herein, refers to a process by which textually distinct text strings that are considered acceptable variations of each other according to the norms of a natural language are assigned the same textual form (e.g., the same spelling).

In some implementations, the technique generates a word error rate (WER) measure based on the normalized reference transcription and the normalized ASR output results. The technique increases the accuracy of the WER measure because it reduces the occasions in which equivalent terms are flagged as different terms because they have different respective textual forms.

In some implementations, the technique can be used to identify occasions in which a compound term ($W_c$) in the original reference transcription and/or the original ASR output results can be properly split into at least a first sub-term ($W_1$) and a second sub-term ($W_2$). The technique can make this judgement based on plural validity tests. Upon determination that the split is appropriate, the technique replaces each occurrence of the combination of the first sub-term ($W_1$) and the second sub-term ($W_2$) in the original reference transcription and the original output results with the compound term ($W_c$).

The technique can capture other types of valid variants by applying plural conversion processes to each original reference term in the original reference transcription, and to each original ASR term in the original ASR output results. This process yields plural conversion results. Guided by these conversion results, the technique identifies at least one group of terms that are considered valid variants of each other. The technique then selects a representative term from the group. The technique uses the representative term to represent each instance in which a member of the group appears in the original reference transcription and the original ASR output results, thereby normalizing these items.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 also itemizes some of the problems that may degrade the WER estimate.

FIG. 6 is a flowchart that provides an overview of one manner of operation of the normalizing component of FIG. 3. FIG. 6 encompasses the operation of the particular normalizing components shown in FIGS. 4 and 5.

FIG. 7 is a flowchart that describes one manner of operation of the normalizing component of FIG. 4.

FIGS. 8 and 9 together are flowcharts that describe one manner of operation of the normalizing component of FIG. 5.

FIG. 10 shows computing equipment that can be used to implement the systems shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for improving the accuracy by which word error rate (WER) is computed for an automated speech recognition (ASR) system. Section B sets forth illustrative methods which explain the operation of the computing system of Section A. And Section C describes illustrative computing functionality that can be used to implement any aspect of the features described in Sections A and B.

A. Illustrative Computing System

This section describes a computer-implemented technique for developing an automate speech recognition (ASR) system. In some implementations, the technique accomplishes this result by improving the accuracy in which word error rate (WER) is estimated. Generally, as used herein, "term" and "word" are used interchangeably. A "term" (or "word") denotes any string of textual characters of any length.

Figure 1:
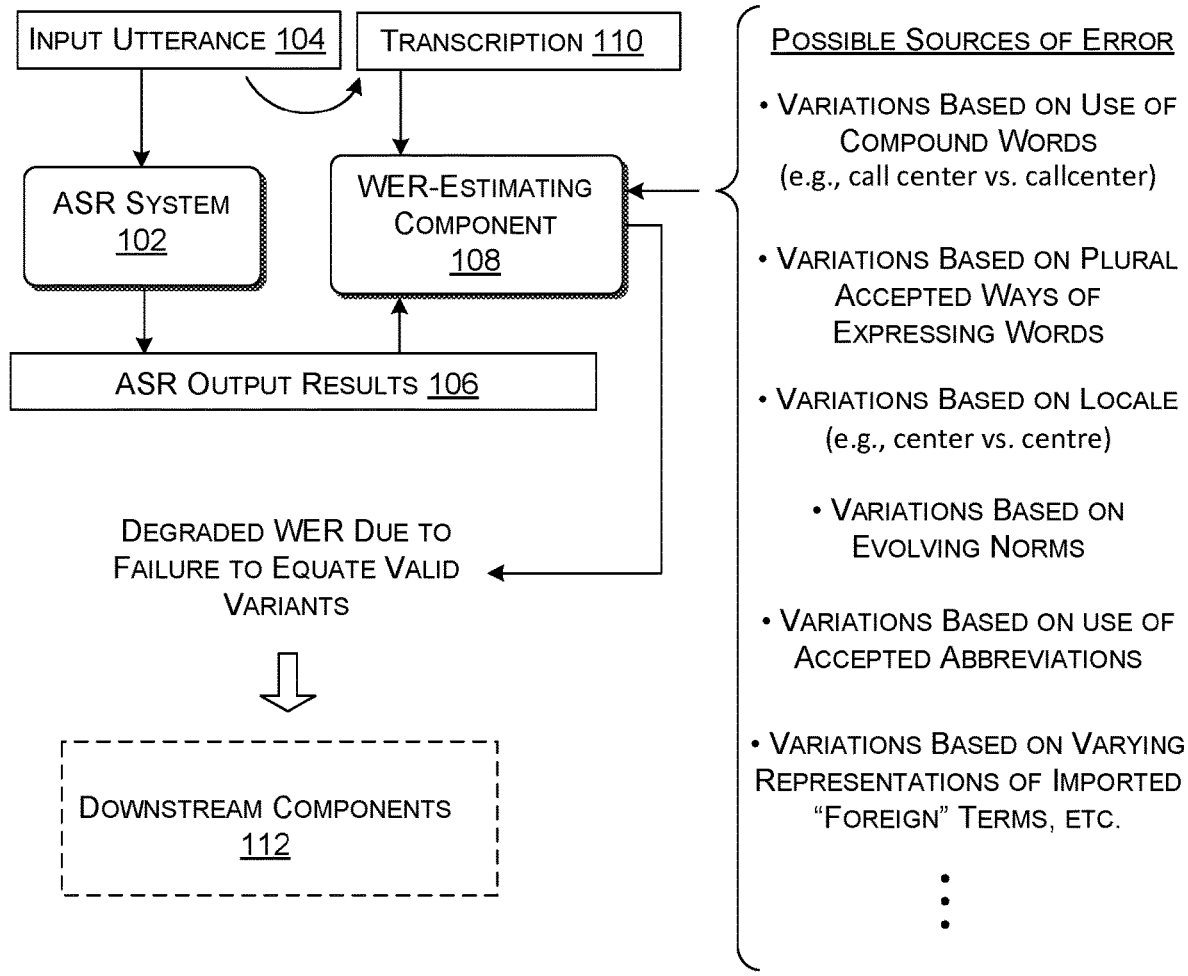
FIG. 1 provides an overview of one manner of computing a word error rate (WER) estimate.

FIG. 1 provides an overview of one manner of computing a WER estimate. As shown there, an ASR system 102 maps an input utterance 104 into ASR output results 106. A WER-estimating component 108 receives two inputs: a given reference transcription 110 of the input utterance and the ASR output results 106. The WER-estimating component 108 generates a WER estimate that characterizes the difference between its two inputs. For example, in some implementations, the WER-estimating component 108 computes the WER estimate as WER=((S+I+D)/N)*100, where S, I, and D are the number of word substitutions, insertions, and deletions that are needed to create the ASR output results 106, starting from the reference transcription 110, and N is the total of words in the reference transcription 110. A developer will strive to build the ASR system 102 such that it exhibits a low WER estimate. This is because an ASR system 102 that has a high WER estimate will typically deliver poor user experience, and may negatively impact any downstream components 112 which consume the ASR output results 106.

Some discrepancies in the ASR output results 106 (relative to the transcription 110) may be due to the ASR system's use of a poorly-performing language model. Yet other discrepancies stem from those cases in which the ASR output results 106 and the transcription 110 use two valid ways to express a term, but the WER-estimating component 108 nonetheless interprets these two variants as different because they have different textual forms (e.g., because they have different spellings). As used herein, two text strings are referred to be "valid variants" of each other when two textually distinct text strings (e.g., having different spellings) are nonetheless considered acceptable ways of expressing a same linguistic entry in a natural language according to the norms of the natural language, e.g., because a dictionary resource designates them as acceptable ways of expressing a same linguistic entry in the dictionary resource. For example, the term "speaker phone" may be considered a valid variant of the canonical term "speakerphone" when a technical dictionary resource includes an entry for "speakerphone" that designates these two terms as acceptable ways of referring to a same entity. Likewise, the phrase "same term" with respect to two textually distinct text strings is shorthand reference to a circumstance in which the first term is considered an acceptable variant of the second term according to the norms of a natural language, and the second term is considered an acceptable variant of the first term according to the norms of the natural language. More generally, a group having any number of terms may be considered acceptable or valid variants of each other based on these considerations.

Further, equivalent pairs of terms need not originate from different sources. For instance, the principles set forth here can be used to establish equivalence among two terms in the original transcription 110 and/or two terms that appear in the original ASR output results 106. Nevertheless, to facilitate explanation, this explanation will continue to focus on the example in which a first member of a pair originates from the original transcription 110 and a second member of the pair originates from the original ASR output results 106.

The right portion of FIG. 1 provides a non-exhaustive summary of the reasons two terms may textually differ, yet be considered acceptable variants of each other. In a first case, a natural language may permit compound words to be expressed in different ways, such as the terms "speakerphone" vs. "speaker phone." This phenomenon is especially pronounced in highly agglutinative languages, such as the Indian languages of Gujarati and Marathi. An agglutinative language is a natural language that abundantly accommodates the formation of compound words in diverse ways. In Gujarati, postfixes (suffixes) are commonly added to preceding nouns, to form a very large number of possible compound terms.

A second factor is a generalization of many of the factors described herein: a natural language may simply accommodate different acceptable ways of spelling words. This factor is evidenced by the interchangeable use of anusvara and halant-forms in the Hindi language. As a third factor, different regions that speak the same natural language may use different spellings of words (e.g., by using "centre" vs. "center"). As a fourth factor, the same region may vary the way they spell words over time (e.g., as evidenced by the German word for "house" spelled with the letter "s" instead of the letter "β"). As a fifth factor, a natural language may accommodate abbreviations of words that constitute valid variants of those words (e.g., by using "OK" vs. "Okay"). As a sixth factor, a natural language may adopt inconsistent ways of expressing "foreign" or "imported" terms, some of which may introduce sounds and characters not found in a native language. This factor is particularly pronounced in some Indian regional languages, where foreign-origin words are transliterated into a native Indian language in inconsistent ways due to regional differences in dialects, accents, etc. To repeat, the above six factors are set forth here in the spirit of illustration, not limitation; there are other reasons why a natural language may consider two or more textually different terms as acceptable variants of each other.

Figure 2:
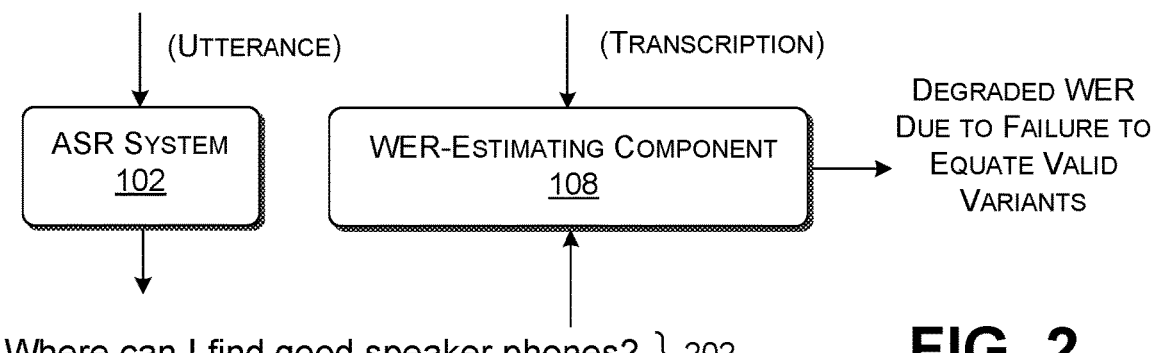
FIG. 2 shows an example in which a degraded WER estimate is produced, attributed to the use of a compound term.

FIG. 2 provides a concrete example of the above types of discrepancies. Here, the ASR system 102 receives an input utterance, "Where can I find good speakerphones," having a transcription of the same form. The ASR system 102 produces ASR output results 202 that reads, "Where can I find good speaker phones?" The term "speaker phones" is an acceptable variant of "speakerphones," but the WER-estimating component 108 may interpret this discrepancy as an error in the output of the ASR system 102.

A developer can address the problem of a poorly-performing ASR system by building a more inclusive language model, e.g., by building a language model that encompasses more of the out-of-vocabulary (OOV) terms. This tactic is problematic because it may be impossible or infeasible to account for all the term variants possible in a particular natural language. Moreover, this tactic produces a large language model, which consumes significant memory and processing resources to run. It is moreover wasteful because many of the discrepancies that contribute to a high WER estimate are not true errors, but are only being interpreted as such by the WER-estimating component 108.

A developer may alternatively attempt to address the above kind of problem by using edit distance to determine whether two terms are the same. However, edit distance is a rough measure that fails to capture the vast number of ways that terms can differ, yet still be considered the same.

Alternatively, or in addition, the developer can fashion ad hoc correction rules. But these rules are cumbersome to develop and run. Moreover, these rules are language-specific in nature, and may fail to account for the diverse ways that terms can vary, yet still be considered the same.

In yet another approach, a developer may produce manually-labeled training examples, e.g., which includes examples of pairs of terms that are considered equivalent and pairs of terms that are not considered equivalent. The developer may then produce a machine-trained classification model based on this manually-curated data set. Yet the creation of this kind of training set is labor intensive. The creation is particularly challenging for some regional languages because there is not enough training data for these languages. Moreover, a classification model developed in this manner applies to a single natural language, and cannot easily be extended to other natural languages. The classification model may furthermore grow stale as terms in the target natural language evolve over time.

Figure 3:
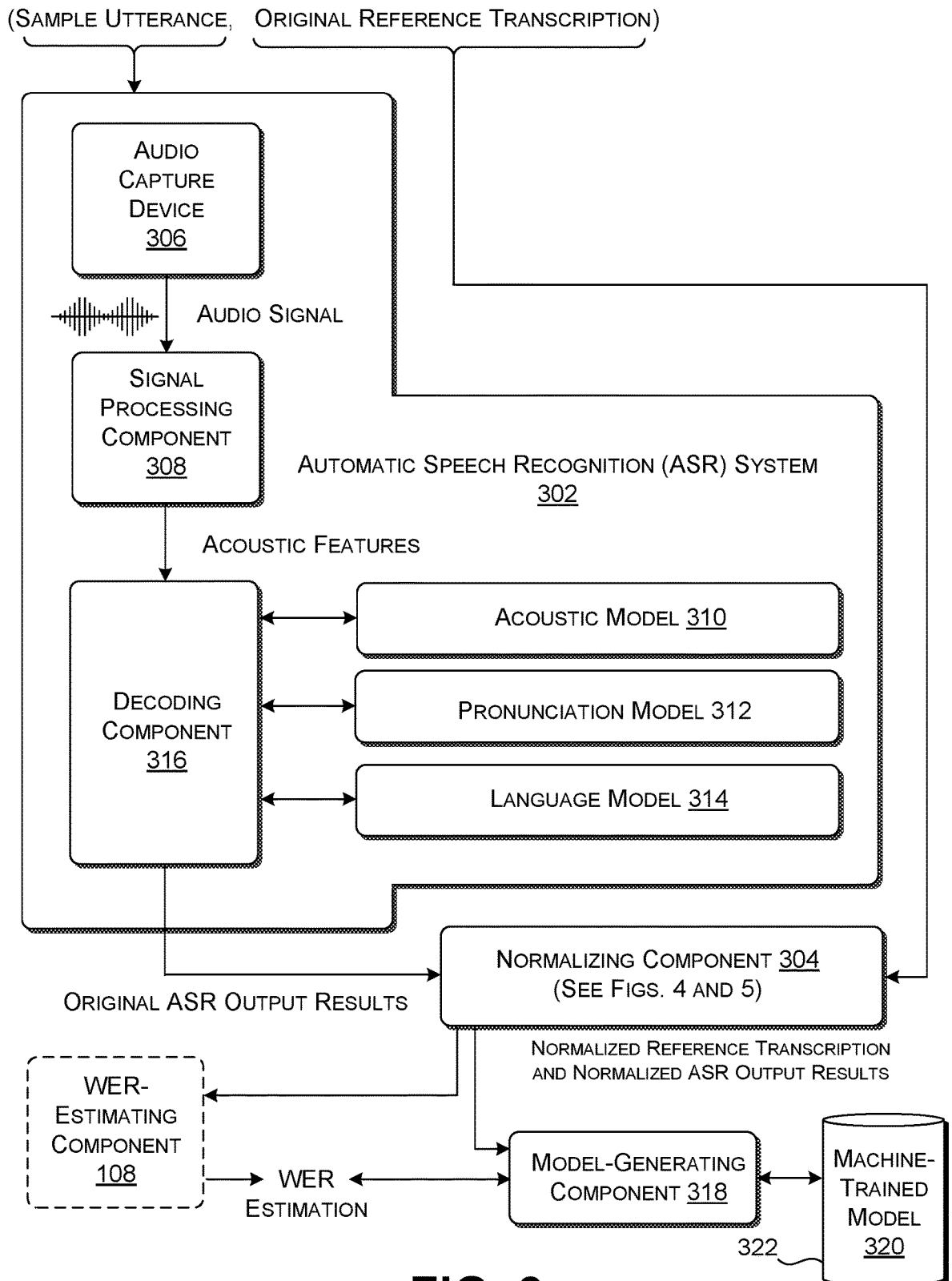
FIG. 3 shows one implementation of an automatic speech recognition (ASR) system, a normalizing component, a WER component, and a model-generating component.

FIG. 3 shows computing systems that provide a solution to the above-noted problems. The computing systems include the ASR system 302 and a normalizing component 304. The ASR system 302 is configured to map a user's input utterance into original ASR output results. An original reference transcription describes the user's input utterance. The normalizing component 304 is configured to transform the original reference transcription into a normalized reference transcription, and to transform the original ASR output results into normalized ASR output results. The normalizing component 304 produces normalized text by replacing each occurrence of a term having accepted variants with a representative (canonical) term associated with those variants. For example, the normalizing component 304 would address the problem shown in FIG. 2 by changing the term "speaker phones" in the ASR output results 202 to "speakerphones." More generally, "normalization" refers to a process whereby text strings that have different textual forms (e.g., different spellings), but are considered acceptable variations of each other, are assigned a same textual form.

The WER-estimating component 108 operates on the normalized reference transcription and the normalized ASR output results, instead of their original counterparts. The WER-estimating component 108 generates a more accurate WER because the source of "false positive" errors has been eliminated (or reduced) by the normalizing component 304. Although not shown, other implementations of the principles set forth herein can normalize input text using the normalizing component 304 without necessarily computing a WER estimate.

Figure 4:
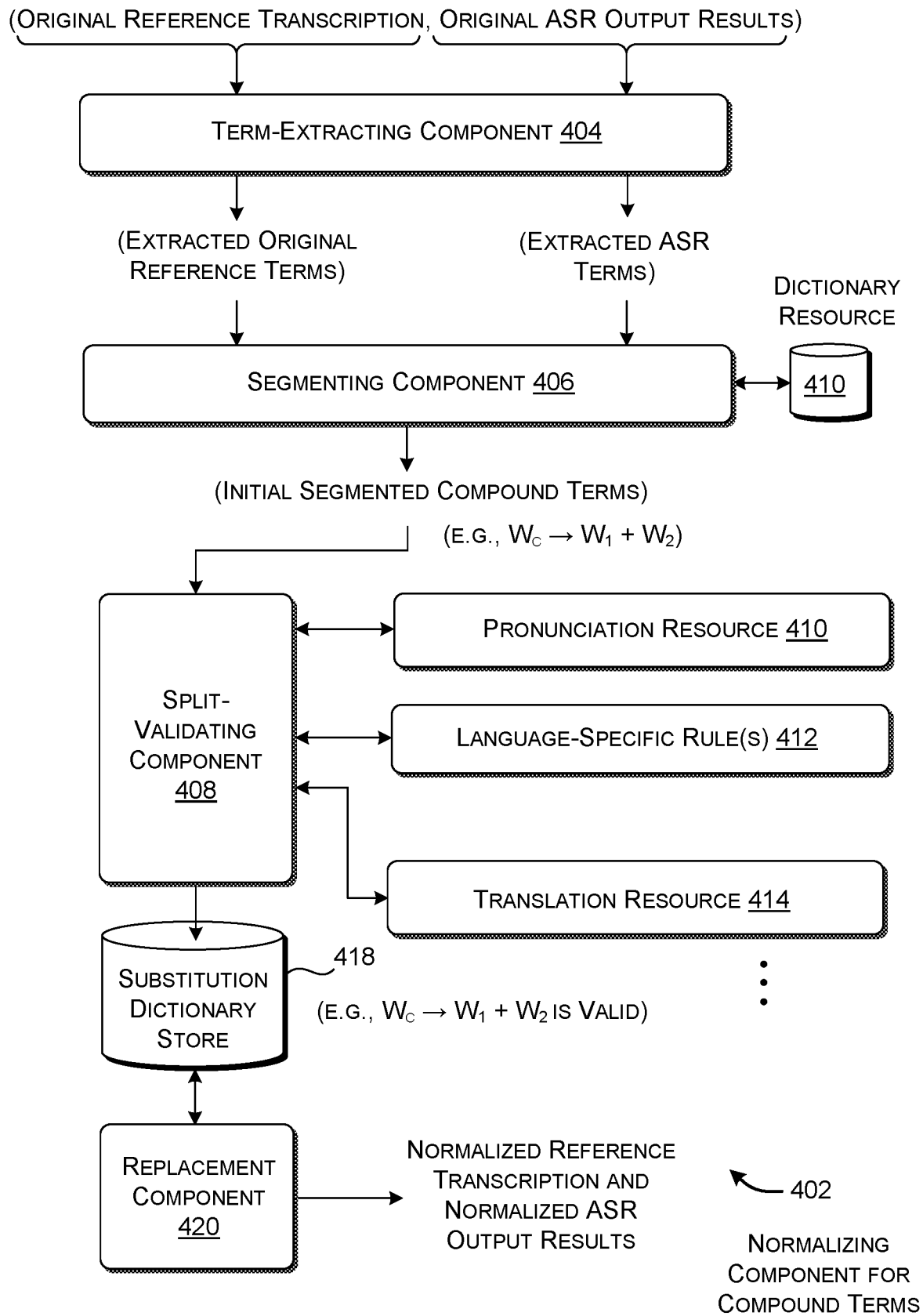
FIG. 4 shows a first implementation of the normalizing component of FIG. 3. This implementation includes logic that accounts for the use of compound terms.

The operation of the ASR system 302 will first be explained in generally top-to-bottom fashion. Two implementations of the normalizing component 304 will be set forth below in the context of the explanation of FIGS. 4 and 5. More specifically, the implementation of the normalizing component 304 shown in FIG. 4 is devoted to normalizing different ways of expressing compound terms. The implementation of the normalizing component shown in FIG. 5 more generally accounts for acceptable spelling variants of the same term. Any given implementation can use either version of the normalizing component 304, or both versions.

The ASR system 302 may correspond to a standalone resource that translates utterances to text, e.g., for use in a dictation application. Alternatively, the ASR system 302 may correspond to a component of a larger application, such as a search application, a question-answering service, a Chabot service, a machine translation service, etc. In those contexts in which the ASR system 302 is part of a larger whole, the ASR output results are passed to one or more downstream components (not shown) for further processing. In these contexts, an application need not display the ASR output results. Rather, the ASR output results are intermediate data which is fed to the downstream component(s).

An audio capture device 306 includes one or more microphones for sensing a user's speech waveform, and producing a raw audio signal in response thereto. A signal processing component 308 discretizes (samples) the raw audio signal to produce digital audio data. The signal processing component 308 then converts the digital data into a stream of audio features that characterize the speech, organized into a series of audio frames. For example, the features correspond to Mel-frequency cepstral coefficients (MFCCs).

An acoustic model 310 converts the stream of audio features into a sequence of phonemes. A phoneme is a unit of sound that makes up part of a word that the user is speaking. Each natural language draws from a predefined vocabulary of such phonemes. In some implementations, the acoustic model 310 performs its mapping function using a statistical machine-trained model, such as a Hidden Markov Model (HMM). A pronunciation model 312 provides information that maps words to the sets of phonemes that make up the respective words. In some implementations, the pronunciation module 312 can implement this mapping information as a dictionary lookup table.

A language model 314 describes the probability of encountering a string of words in a speech utterance, expressed in a particular natural language. In some implementations, the language model 314 is implemented as an n-gram model. For example, a bigram language model describes the probability of encountering a word $w_i$ in a speech utterance, given that the detected occurrence of a preceding word $w_{i-1}$ (e.g., $P(w_i|w_{i-1})$). The probability of a complete sequence of words is found by forming the product of the individual probabilities associated with the words given by the bigram model.

The probabilities defined by the acoustic model 310, the pronunciation model 312, and the language model 314 collectively define a search space. A decoding component 316 searches through the search space to find the interpretation of the user's input utterance that has the highest probability. In some implementations, the decoding component 316 performs its search using the Viterbi algorithm in conjunction with beam search. This approach provides an approximation of the interpretation having the highest interpretation, not necessarily the best possible interpretation. The operation of the Viterbi algorithm can be expressed in mathematical terms as follows:

$$P(W \mid X) = \underset{W}{\mathrm{argmax}} P(X \mid W) P(W). \qquad (1)$$

Equation (1) states that the probability of a word sequence W occurring, given the detected occurrence of a string of audio feature vectors X, is formed by searching through probability information given by the acoustic model 310 and the pronunciation model 312 (e.g., P(X|W)), together with probability information given by the language model 314 (e.g., P(W)).

The above-described description of ASR processing is set forth in the spirit of illustration, not limitation. The improvements described herein can be implemented in the context of other kinds of ASR frameworks. For example, other implementations of the ASR system 302 can use one or more deep neural networks (DNNs) to perform the above-described speech recognition functions. Indeed, in an end-to-end DNN, a single neural network is used to convert a sequence of audio vectors into the ASR output results.

FIG. 3 also shows a model-generating component 318 that a developer can use to develop a machine-trained model 320, for storage in a model data store 322. For example, the normalizing component 304 can normalize a set of training data that is used by the model-generating component 318 to train the language model 314 that is used by the ASR system 302. The model-generating component 318 may derive a more robust language model 314 by virtue of the fact that the training data is made more consistent by normalization. A more robust language model 314, in turn, may consume less computing resources compared to a more complex, but less efficient, machine-trained model.

For instance, assume that the ASR output results includes the word "center," while the original reference transcription uses the word "centre." By associating both of these terms with the canonical term "center," the model-generating component 318 can correctly update the number of times that the word "center" occurs within a natural language, thus producing a more accurate n-gram model. Further, normalization can allow the model-generating component 314 to produce a more compact language model 314, compared to the case in which normalization is not used. For instance, the language model 318 need not incorporate separate entries for "centre" and "center," and the ASR system 302 need not be tasked with the responsibility of discriminating between these two terms in a user's input speech. This provisional is especially valuable when applied to some regional Indian natural languages, where, as stated, there can be many acceptable ways to spell the same word, e.g., due to transcription of a foreign word into a native Indian language.

In some implementations, a developer can specifically use the WER estimate (which is computed based on the output of the normalizing component 304) as a guide to develop a compact machine-trained model 320, such as a compact language model 314. This is because, without the benefits of normalization, the developer may be misled into thinking that the language model 314 is deficient because it fails to recognize certain terms, which the developer interprets as out-of-vocabulary terms. The developer may be motivated by these results to increase the size and complexity of the language model 314 by including additional terms to its dictionary. In contrast, with the benefits of normalization, the WER estimate will more correctly reflect the true performance of the language model 314 (compared to the case in which normalization is not used). This will lead to a reduction to the number of instances in which the developer unnecessarily increases the size and complexity of the language model 314, e.g., by including the word "centre" as a distinct entry in the language model 314. This, in turn, will yield a compact language model 314.

The model-generating component 318 can produce a statistical language model by counting occurrences of terms in a training corpus, and appropriately normalizing the resultant frequency measures. More generally, the model-generating component 318 can use any other technique to generate the machine-trained model 320, such as stochastic gradient descent and backpropagation.

Other implementations can leverage the normalizing component 304 in other ways. For example, other implementations can use the normalizing component 304 to determine a canonical form of a term that has multiple acceptable variations. In the production (inference) stage, the ASR system 302 can then use the normalizing component 302 to convert a non-preferred variant to its canonical counterpart, e.g., by changing "smart phone" to "smartphone." This operation will improve the performance of any downstream component that operates on the basis of the ASR output results. For example, assume that a downstream component is a search engine that performs a search based on the ASR output results. The search engine can perform a more accurate result by converting terms to their canonical form, e.g., by converting "smart phone" to "smartphone."

In other implementations, the model-training component 318 can use the normalizing component 304 to normalize a set of training data that is used to train any machine-trained model 320 (not limited to a language model) for any natural language processing (NLP) application that involves the use of automatic speech recognition.

In other implementations, any user, including an end user, can use the WER-estimating component 108 to accurately gauge the true performance of the ASR system 302. This enables, for instance, the user to more accurately compare the performance of the ASR system 302 with other ASR systems.

The above computer-implemented applications are described here in the spirit of illustration, not limitation. Other implementations can make use of the normalizing component 304 in other ways.

FIG. 4 shows a first implementation of the normalizing component 402 that is devoted to normalizing acceptable variants of compound terms. The normalizing component 402 begins by receiving an original reference transcription of an input utterance (which may be provided in manual fashion), together with ASR output results generated by the ASR system 302 based on the input utterance. The original reference transcription includes a sequence of original references terms, corresponding to a body of text having any length. For example, the text can correspond to a book-length resource. The designator "original" is added to differentiate the original reference transcription from its normalized counterpart to be generated by the normalizing component 402.

A term-extracting component 404 extracts the individual terms in the original reference transcription, to produce a plurality of original reference terms. Likewise, the term-extracting component 404 extracts the individual terms in the original ASR output results to produce a plurality of original ASR terms.

A segmenting component 406 segments any compound term produced by the term-extracting component 404 that is capable of being segmented. It yields one or more segmented compound terms. For example, the segmenting component 406 can indicate that a compound term We (extracted from the original reference transcription and/or the original ASR output results) includes two sub-terms ($W_1$, $W_2$). Note however, that any conclusion drawn by the segmenting component 406 is preliminary in nature because it has not been verified, which is the function of a split-validating component 408 to be described in greater detail below.

The segmenting component 406 can use any segmenting tool to segment a candidate term. One such resource is the Morfessor tool, e.g., described in CREUTZ, et al., "Unsupervised Discovery of Morphemes," in Morphological and Phonological Learning: Proceedings of the 6th Workshop of the ACL Special Interest Group in Computational Phonology (SIGPHON), Association for Computational Linguistics, July 2002, pp. 21-30, and SMIT, et al., "Morfessor 2.0: Toolkit for Statistical Morphological Segmentation," in Proceedings of the Demonstrations at the 14th Conference of the European Chapter of the Association for Computational Linguistics, Association for Computational Linguistics, April 2014, pp. 21-24. Another resource is the WordPiece model, e.g., described in WU, et al., "Google's Neural Machine Translation System: Bridging the Gap between Human and Machine Translation," arXiv:1609.08144v2 [cs.CL], Oct. 8, 2016, 23 pages. Another resource is the SentencePiece tool, e.g., described in KUDO, et al., "SentencePiece: A Simple and Language Independent Subword Tokenizer and Detokenizer for Neural Text Processing," arXiv:1808.06226v1 [cs.CL], Aug. 19, 2018, 6 pages. Another resource is the byte-pair-encoding (BPE) tool, e.g., described in SENNRICH, et al., "Neural Machine Translation of Rare Words with Subword Units," arXiv: 1508.07909v5 [cs.CL], Jun. 10, 2016, 11 pages. All of the references cited in this paragraph are incorporated by reference herein.

For example, one implementation of the Morfessor tool breaks up each candidate term under consideration based on a codebook. The codebook describes the permissible sub-terms that can be used to partition each candidate term. In some implementations, the Morfessor tool can iteratively derive the codebook in a prior training process by serially processing the terms that compose a Morfessor training corpus. That is, for each candidate term that is randomly chosen from the Morfessor training corpus, the Morfessor tool attempts to choose a segmentation that will best improve a cost function. One cost function includes a first cost measure that is defined as the negative log likelihood of identified sub-terms in the codebook in its current state, and a second cost measure that depends on the size of the codebook in its current state. More generally stated, the Morfessor tool adopts this cost function to reward the selection of frequently-occurring sub-terms (thus producing a compact representation of the Morfessor training corpus) while economizing the number of sub-terms in the codebook (thus producing a compact codebook). The Morfessor tool terminates the above-described process when a predetermined training objective is achieved, such as a predetermined cost threshold value.

To repeat, however, the use of the Morfessor tool is mentioned here by way of illustration, not limitation. For instance, in another approach, the segmenting component 406 can generate preliminary segmentations based on manually-chosen parsing rules. For example, this approach can rely on a codebook of permitted sub-terms manually chosen by a developer. In another approach, the segmenting component 406 can iteratively derive a codebook of sub-terms by successively growing the sizes of the sub-terms in the codebook using the principles underlying the byte-pass-encoding (BPE) technique, starting with sub-terms having the sizes of single characters, with the objective of optimizing a specified cost function.

If the segmenting component 406 successfully partitions a candidate term under consideration, that candidate word constitutes a candidate compound word. For example, assume that the term under consideration is "arrangements." The segmenting component 406 may break this word up into the preliminary sub-terms of "arrange," "ment," and "s." In other cases, the segmenting component 406 may conclude that a candidate term under consideration cannot be segmented. If so, the segmenting component omits that term from further processing.

The split-validating component 408 determines whether each candidate segmentation proposed by the segmenting component 406 is valid. The split-validating component 408 makes this determination, based on plural resources (410, 412, 414, . . . ). The first resource is a pronunciation resource 410. The pronunciation resource 410 identifies the pronunciation of a compound word under consideration, and the pronunciation of each of its component sub-terms. In one implementation, the pronunciation resource 410 determines the pronunciation of each input text string by using a machine-trained model to map features that describe the text string into pronunciation information that expresses how the text string should be pronounced. Without limitation, illustrative machine-trained models that can be used to perform this task include a convolutional neural network (CNN), a sequence-to-sequence recurrent neural network (RNN), a transformer-based model, etc. Alternatively, or in addition, the pronunciation resource 410 can perform its text-to-pronunciation mapping function based on a manually-generated lookup table, a rules-based system, etc.

According to one rule, the split-validating component 408 concludes that a proposed segmentation is tentatively valid if the combined (e.g., concatenated) pronunciations of a compound word's sub-terms are the same as the pronunciation of the compound word as a whole. Based on this rule, for example, the split-validating component 408 will conclude that segmentation of "subscription" into the sub-terms "subscript" and "ion" is invalid. This is because "ion" has a different pronunciation when considered as a separate sub-term, compared to its pronunciation within the compound word "subscription." In contrast, the split-validating component 408 will conclude that decomposition of the Indian word "Nehruji" into "Nehru" and "ji" is tentatively valid because "Nehru" and "Ji" share the same pronunciation as their counterparts in the compound word "Nehruji." Note that this rule is agnostic with respect to natural language because it applies to all natural languages. Note that a segmentation is deemed "tentatively" valid because the segmentation may ultimately fail because it does not satisfy one or more additional validity tests.

A second resource is made up of one or more language-specific rules 412 that are intended to enforce the linguistic integrity of sub-terms. For example, a subset of rules defines what constitutes an invalid sub-term. In Indian languages, one such rule may specify that no sub-term can commence with a Matra (which is a particular kind of character in Indian languages).

A third resource is translation resource 414. The translation resource 414 maps a compound word, composed of two or more sub-terms, from its given natural language into another natural language, e.g., by converting an Indian word into an English word. The translation resource 414 then forms a phrase by combining the word's sub-terms, with each sub-term separated by its next sub-term (if any) by a white space. The translation resource 414 then maps the phrase from its given natural language to the other natural language. The split-validating component 408 concludes that a segmentation is tentatively valid if the translation of the compound word is the same as the translation of its corresponding phrase. For example, the split-validating component 408 may conclude that the proposed segmentation of "subscription" into "sub" "script" and "ion" is not a good segmentation, because the term "subscription," when translated into German, is not equivalent the German translation of the phrase "sub script ion." The translation resource 414 can be implemented using the same kind of technology as the pronunciation resource 508, e.g., as a machine-trained model (e.g., a CNN, RNN, transformer-based model, etc.), a lookup table, a rules-based system, etc.

The above three types of resources (410, 412, 414) are set forth here in the spirit of illustration, not limitation. Other implementations that work with other natural languages can adopt other types of resources to gauge the validity of a proposed segmentation. Note that the pronunciation-centric validity test and the translation-centric test provide good insight regardless of the input natural language, and therefore can be considered as techniques that are agnostic with respect to natural language.

In some implementations, the split-validating component 408 makes a final determination that a proposed segmentation is valid if all of its sub-tests return a conclusion of "valid." This is a useful provision because a bad match between terms may be revealed by some sub-tests, but not other sub-tests. In other implementations, the split-validating component 408 can adopt one or more language-specific rules to interpret the results of sub-tests. For example, other implementations can adopt a rule which allows relaxation of the pronunciation sub-test, e.g., by allowing two pronunciations to vary in some regards, but not other regards. In another case, the pronunciation resource 410 establishes that a single term can have two or more possible pronunciations. Here, other implementations can adopt a rule that establishes a match if two terms under comparison share at least one of the established pronunciations. In other implementations, the split-validating component 408 can define two text strings as the same when they map to distributed vectors in vector space within a prescribed distance from each other (e.g., as measured by cosine similarity). Still other relaxations on matching are possible.

Assume that the split-validating component 408 concludes that a proposed segmentation is valid. If so, it adds the proposed segmentation to a substitution data store 418, e.g., by indicating that sub-terms $W_1$ and $W_2$ are valid components of the compound term $W_C$. On the other hand, assume that the split-validating component 408 concludes that the proposed segmentation is not valid. If so, it does not update the substitution data store 418 for this segmentation.

Finally, a replacement component 420 replaces each occurrence of the combination ($W_1$, $W_2$) in the original reference transcription and the original ASR output results with the compound term $W_C$. This produces a normalized reference transcription and normalized ASR output results. Note that this normalization process may or may not involve modifications to the original reference transcription, and may or may not involve modifications to the original ASR output results. Even when no changes are made, the replacement component 420 can be said to produce a normalized reference transcription and normalized ASR output results because it processes these text strings with the intent of ensuring each term that belongs to a group of acceptable variants is replaced with a representative (canonical) term assigned to that group of variants. In other words, normalized text is text that is produced as an outcome of a normalization process. A normalization process is a process of ensuring that two pieces of text refer to the same linguistic entries in a natural language using terms having the same respective textual forms (e.g., spellings).

The normalized reference transcription and the normalized ASR output results are then fed to the WER-estimating component 108, instead of their original counterparts. In other implementations, these normalized items are used by some other downstream component (not shown), without necessarily computing a WER estimate.

Figure 5:
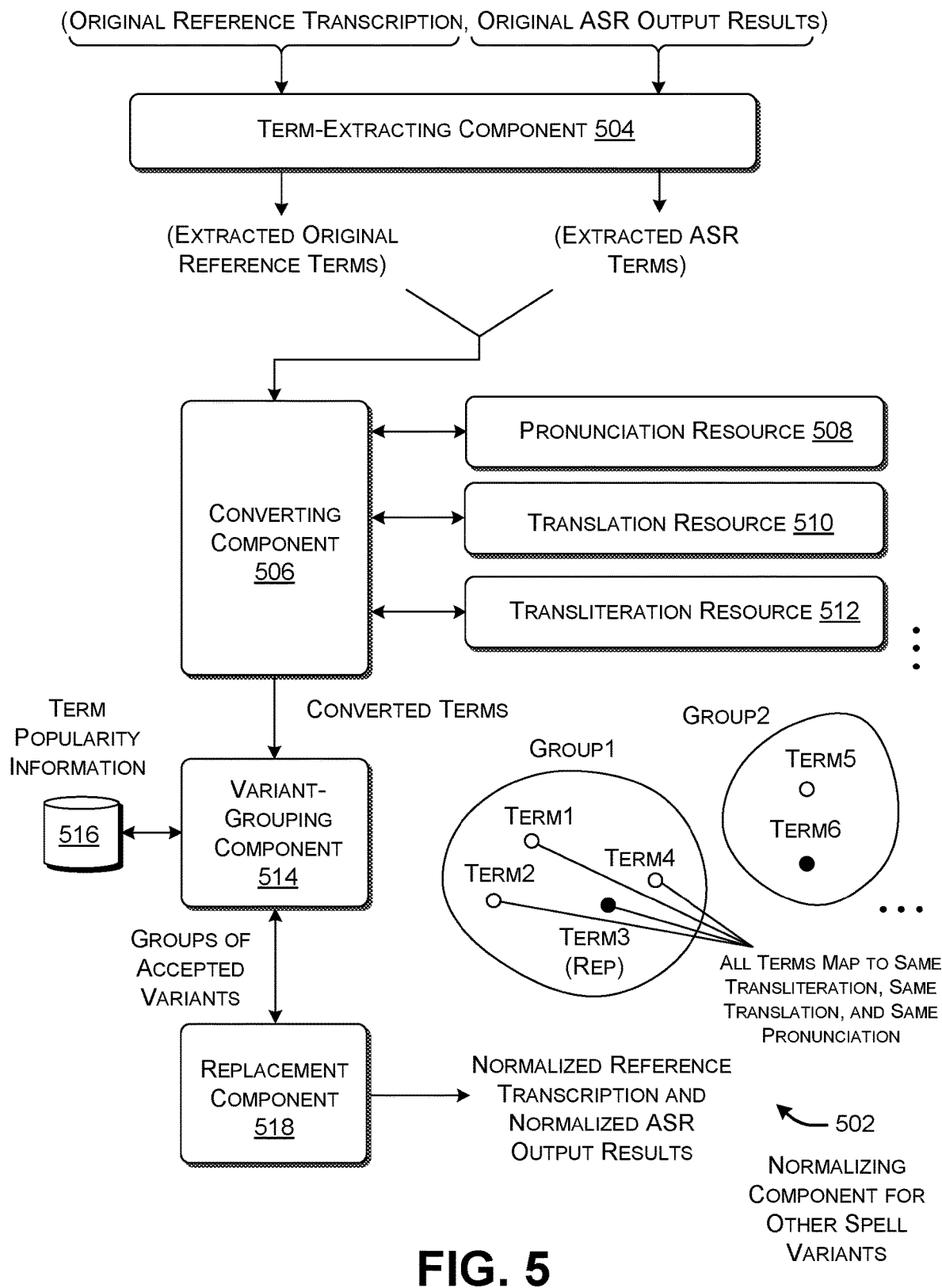
FIG. 5 shows a second implementation of the normalizing component of FIG. 3. This implementation includes logic that accounts for other ways in which terms may acceptably vary.

FIG. 5 shows a second implementation of a normalizing component 502 that has broader application than the normalizing component 402 of FIG. 4, in that it more broadly attempts to normalize equivalent terms that differ in their respective spellings. The terms may use different spellings, in turn, for any of the reasons summarized above in connection with the explanation of FIG. 1. Like the implementation of FIG. 4, the normalizing component 502 includes a term-extracting component 504 for extracting original reference terms from the original reference transcription, and extracting original ASR terms from the original ASR output results.

A converting component 506 performs various conversion processes on each term extracted by the term-extracting component 504, using a collection of processing resources (508, 510, 512, . . . ). Each such extracted term is referred to below as a candidate term, without reference to the source from which it originated (which may be the original reference transcription or the original ASR output results, or both). A pronunciation resource 508 maps features associated with the candidate term to pronunciation information that conveys how the candidate term should be pronounced. A translation component 510 translates the candidate term from its given natural language to another natural language, e.g., by translating an Indian language term to its English counterpart. A transliteration component 512 converts the candidate term into its transliteration. Each of these resources (508, 510, 512) can be implemented in any of the ways described above, e.g., as a machine-trained model (e.g., a CNN, RNN, transformer-based model, etc.), a lookup table, a rules-based system, etc.

A variant-grouping component 514 forms groups (e.g., clusters) of terms that have similar characteristics because they are acceptable variants of each other. For example, the variant-grouping component 514 can form a cluster of terms, each of which map to the same pronunciation, the same translation, and the same transliteration. Zero, one, or more of these terms may originate from the original reference transcription. Zero, one, or more of these terms may originate from the original ASR output results. The variant-grouping components 514 can form these groups in different ways. In one approach, the variant-grouping component 514 can form sub-groups of terms that share the same pronunciations, sub-groups of terms that share the same transliterations, and sub-groups of terms that share the same translations. The variant-grouping component 514 can then determine the intersection of these sub-groups to identify clusters of terms that share the same pronunciations, transliterations, and translations.

Other implementations can relax the criteria that defines what properties a term must have to qualify for membership in the group. For example, assume that one or more of the resources (508, 510, 512) map a candidate term into a distributed vector in a vector space. The variant-grouping component 514 can specify that two terms are acceptable variants if these two vectors are separated in vector space by no more than a prescribed distance (e.g., as measured by cosine similarity). In addition, or alternatively, the variant-grouping component 514 can apply one or more rules that define circumstances in which one or more matching conditions need not be satisfied, or need not be fully satisfied. For example, a rule may indicate that two pronunciations are considered a valid match if they agree in some regards, but not other regards.

The variant-grouping component 514 then chooses a representative term from each group, which will serve as the canonical member of the group. The variant-grouping component 514 can perform this task by consulting a resource 516 that provides term popularity information, such as the unigram weights provided by a language model. The variant-grouping component 514 can choose the representative term having the highest frequency-of-occurrence as the representative term. In other cases, the variant-grouping component 514 can use other criteria for choosing the representative term, such as by randomly selecting a particular term in a group as the representative term. This option may be appropriate for the case in which no term in the group is considerably more popular than the others.

FIG. 5 shows two representative groups: Group1 and Group2. Group1 has four members, with a Term3 chosen as the representative member because it has the highest frequency of occurrence. Group2 has two members, with Term6 chosen as the representative member because it has the highest frequency of occurrence.

Finally, a replacement component 518 identifies terms in the original reference transcription and the original ASR results that match any of the terms in the groups created by the variant-grouping component 514. The replacement component 518 then replaces each identified term with its representative canonical counterpart. For example, consider Term2 which appears in Group1. Assume that the replacement component 518 determines that Term2 appears twice in the original reference transcription. In response, the replacement component 518 replaces Term2 in the original reference transcription with the representative Term3. Overall, the operation of the replacement component 518 generates a normalized reference transcription and normalized ASR output results. These normalized items are then fed to the WER-estimating component 108, instead of their original counterparts. In other implementations, these normalized items are used by some other downstream component (not shown), without necessarily computing a WER estimate.

In conclusion to Section A, the normalizing component 304 (which encompasses the embodiments of FIGS. 4 and 5) normalizes accepted variations of the same term across the original reference transcription and the original ASR output results. In some implementations, this normalization allows the model-generating component 318 to generate a more accurate and resource-efficient language model 314. Other ASR applications of the normalizing component 304 are set forth above.

The normalizing components (402, 502) described herein can also be developed without burdensome effort on the developer's part. This is because the normalizing components (402, 502) rely, in part, on the use of signals from preexisting general-purpose machine-trained models (such as general-purpose translation models, pronunciation models, transliteration models, etc.) to make segmentation validity decisions. Reliance on these preexisting general-purpose machine-trained models constitutes supervision-by-proxy, and eliminates the burdensome need for the developer to generate handcrafted rules and/or custom machine-trained models based on specially-curated and labeled training data sets. More formally stated, the normalizing components (402, 502) rely on at least one machine-trained resource that has been developed to serve plural functions other than normalizing text (or at least not limited to normalizing text). A translation resource (such as MICROSOFT TRANSLATOR produced by MICROSOFT CORPORATION of Redmond, Washington) is an example of a general-purpose machine-trained model that is built to operate in any application that requires the determination of the translation of words, not limited to the particular validation processes described herein. (Note however, that other implementations can use one or more custom machine-trained models.)

Further still, the normalizing components (402, 502) also incorporates some validity tests that are applicable to any natural language. This factor makes the solution described herein scalable to different language environments. Note that the normalizing component 402 of FIG. 4 may include some language-specific rules that a developer manually creates, but the overall design reduces the need for such handcrafted rules.

B. Illustrative Processes

FIGS. 6-9 show processes that explain the operation of various computing systems of Section A in flowchart form. Since the principles underlying the operation of the computing systems have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

More specifically, FIG. 6 shows a process 602, performed, in part, by the normalizing component 304, for developing a language model 314 used in an automatic speech recognition (ASR) system 302. In block 604, the normalizing component 304 obtains a sample utterance and an original reference transcription of the sample utterance, for use in developing the language model. In block 606, the normalizing component 304 converts the sample utterance to original ASR output results using the ASR system 302. The original reference transcription has at least one original reference term that is considered to be a valid variant of a corresponding original ASR term in the original ASR output results, and wherein the original reference term has a different textual form than the original ASR term. More generally, two text strings are considered valid (or acceptable) variants of each other when the norms of a natural language, e.g., as formalized in a dictionary resource or other authoritative source, designate them as referring to a same linguistic entry in the natural language. In block 608, the normalizing component 304 produces a normalized reference transcription and normalized ASR output results, the normalized reference transcription having a normalized reference term that is a counterpart of the original reference term (because it corresponds to the original reference term), and the normalized ASR output results having a normalized ASR term that is a counterpart of the original ASR term (because it corresponds to the original ASR term), the normalized reference term having a same textual form as the normalized ASR term. "Normalization" generally refers to a process whereby two text strings that have different textual forms (e.g., different spellings) are assigned a same textual form. Block 608 relies on at least one machine-trained resource that has been developed to serve plural functions, e.g., other than normalizing text. In block 610, the model-generating component 318 develops the language model 314 based, at least in part, on the normalized reference transcription and/or the normalized ASR output results.

In some implementations, the process 602 further includes generating a word error rate (WER) measure by comparing the normalized reference transcription with the normalized ASR output results. The language model 314 is developed, in part, based on guidance provided by the WER measure. For example, the WER measure can be used to identify errors and inefficiencies in the language model 314, in its current state. This insight, in turn, can be used to retrain and/or reconfigure the language model 314, to ultimately improve the quality of the ASR system 302.

FIG. 7 shows a process 702, performed by the normalizing component 402 of FIG. 4, for normalizing text. In block 704, the normalizing component 402 obtains a sample utterance and an original reference transcription of the sample utterance. In block 706, the normalizing component 402 converts the sample utterance to original automatic speech recognition (ASR) output results using an ASR process. In block 708, the normalizing component 402 uses a segmentation algorithm to convert at least one compound term that appears in the original reference transcription and/or the original ASR output results into a combination of at least a first sub-term and a second sub-term. In block 710, the normalizing component 402 uses at least one validity test to determine that it is appropriate to split the compound term into the combination of the first sub-term and the second sub-term. Block 710 relies on at least one machine-trained resource that has been developed to serve plural functions, e.g., other than normalizing text. In block 712, the normalizing component 402 replaces each occurrence of the combination of the first sub-term and the second sub-term in the original reference transcription and the original ASR output results with the compound term, to produce a normalized reference transcription and normalized ASR output results. In block 714, the process 702 uses the normalized reference transcription and/or the normalized ASR output results to improve performance a computer-implemented ASR application. The process 702, for instance, may include generating a more accurate and resource-efficient language model 314 of the ASR system 302.

FIGS. 8 and 9 together show another process 802, performed by normalizing component 502 of FIG. 5, for normalizing text. In block 804, the normalizing component 502 obtains a sample utterance and an original reference transcription of the sample utterance. In block 806, the normalizing component 502 converts the sample utterance to original automatic speech recognition (ASR) output results using an ASR process. In block 808, the normalizing component 502 applies plural conversion processes to each original reference term in the original reference transcription, and to each original ASR term in the original ASR output results, to produce plural conversion results. Block 808 relies on at least one machine-trained resource that has been developed to serve plural functions, e.g., other than normalizing text. In block 810, the normalizing component 502 identifies at least one group of terms that are considered valid variants of each other, based on the plural conversion results. In block 812, the normalizing component 502 selects a representative term from the group. In block 902 of FIG. 9, for each identified term in the original reference transcription and the original ASR output results that matches a member of the group other than the representative term, the normalizing component 502 replaces the identified term with the representative term, the operation of replacing producing a normalized reference transcription and normalized ASR output results. In block 904, the model-generating component 318 uses the normalized reference transcription and/or the normalized ASR output results to improve performance a computer-implemented ASR application. The computer-implemented process 802, for instance, may include generating a more accurate and resource-efficient language model 314 of the ASR system 302.

C. Representative Computing Functionality

FIG. 10 shows an example of computing equipment that can be used to implement any of the systems summarized above. The computing equipment includes a set of user computing devices 1002 coupled to a set of servers 1004 via a computer network 1006. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1006 can be implemented as a local area network, a wide area network (e.g., the Internet), one or more point-to-point links, or any combination thereof.

FIG. 10 also indicates that the ASR system 302, the normalizing component 304, and the WER-estimating component 108 can be spread across the user computing devices 1002 and/or the servers 1004 in any manner. For instance, in one case, the ASR system 302 is entirely implemented by one or more of the servers 1004. An entity may interact with the servers 1004 via a browser application or other programmatic interface provided by a user computing device. In another case, the ASR system 302 is entirely implemented by a local computing device in local fashion, in which case no interaction with the servers 1004 is necessary. In another case, the functionality associated with the ASR system 302 is distributed between the servers 1004 and each user computing device in any manner.

Figure 11:
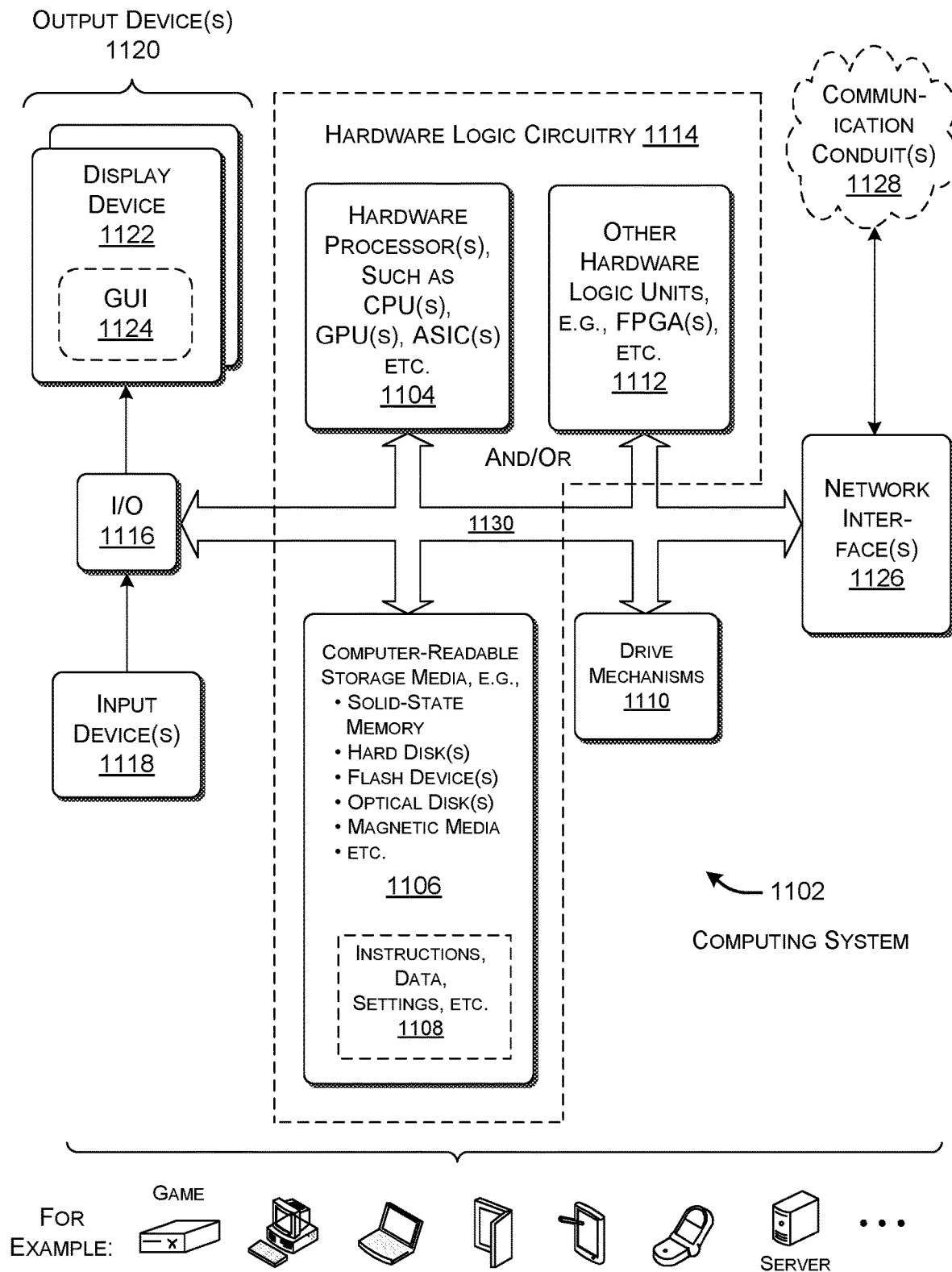
FIG. 11 shows an illustrative type of computing system that can be used to implement any aspect of the features shown in the foregoing drawings.

FIG. 11 shows a computing system 1102 that can be used to implement any aspect of the mechanisms set forth in the above-described figures. For instance, the type of computing system 1102 shown in FIG. 11 can be used to implement any user computing device or any server shown in FIG. 10. In all cases, the computing system 1102 represents a physical and tangible processing mechanism.

The computing system 1102 can include one or more hardware processors 1104. The hardware processor(s) 1104 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1102 can also include computer-readable storage media 1106, corresponding to one or more computer-readable media hardware units. The computer-readable storage media 1106 retains any kind of information 1108, such as machine-readable instructions, settings, data, etc. Without limitation, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable unit of the computing system 1102. Further, any instance of the computer-readable storage media 1106 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing system 1102, and/or a hardware storage unit (such as a hard disk) for retaining/archiving information on a more permanent basis. In the latter case, the computing system 1102 also includes one or more drive mechanisms 1110 (such as a hard drive mechanism) for storing and retrieving information from an instance of the computer-readable storage media 1106.

The computing system 1002 may perform any of the functions described above when the hardware processor(s) 1104 carry out computer-readable instructions stored in any instance of the computer-readable storage media 1106. For instance, the computing system 1102 may carry out computer-readable instructions to perform each block of the processes described in Section B.

Alternatively, or in addition, the computing system 1102 may rely on one or more other hardware logic units 1112 to perform operations using a task-specific collection of logic gates. For instance, the hardware logic unit(s) 1112 may include a fixed configuration of hardware logic gates, e.g., that are created and set at the time of manufacture, and thereafter unalterable. Alternatively, or in addition, the other hardware logic unit(s) 1112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic unit(s) 1112. That is, the computing system 1102 can employ any combination of the hardware processor(s) 1104 that execute machine-readable instructions provided in the computer-readable storage media 1106, and/or one or more other hardware logic unit(s) 1112 that perform operations using a fixed and/or programmable collection of hardware logic gates. More generally stated, the hardware logic circuitry 1114 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1114 that performs a particular function or combination of functions.

In some cases (e.g., in the case in which the computing system 1102 represents a user computing device), the computing system 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1102 can also include one or more network interfaces 1126 for exchanging data with other devices via one or more communication conduits 1128. One or more communication buses 1130 communicatively couple the above-described units together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing system 1102 as being composed of a discrete collection of separate units. In some cases, the collection of units corresponds to discrete hardware units provided in a computing device chassis having any form factor. FIG. 11 shows illustrative form factors in its bottom portion. In other cases, the computing system 1102 can include a hardware logic unit that integrates the functions of two or more of the units shown in FIG. 1. For instance, the computing system 1102 can include a system on a chip (SoC or SOC), corresponding to an integrated circuit that combines the functions of two or more of the units shown in FIG. 11.

The following summary provides a non-exhaustive set of illustrative examples of the technology set forth herein.

(A1) According to a first aspect, some implementations of the technology described herein include a computer-implemented method (e.g., the process 602) for developing a model (e.g., the language model 314) used in an automatic speech recognition (ASR) system (e.g., the ASR system 302). The method includes: obtaining (e.g., 604) a sample utterance and an original reference transcription of the sample utterance, for use in developing the model; and converting (e.g., 606) the sample utterance to original ASR output results using the ASR system. The original reference transcription has at least one original reference term that is considered to be a valid variant of a corresponding original ASR term in the original ASR output results, and wherein the original reference term has a different textual form than the original ASR term. The method further includes producing (e.g., 608) a normalized reference transcription and normalized ASR output results. The normalized reference transcription has a normalized reference term that is a counterpart of the original reference term (because it corresponds to the original reference term), and the normalized ASR output results has a normalized ASR term that is a counterpart of the original ASR term (because it corresponds to the original ASR term), the normalized reference term having a same textual form as the normalized ASR term. "Normalization" itself refers to a process by which two textually distinct text strings that are considered acceptable variations of each other according to the norms of a natural language are assigned the same textual form (e.g., the same spelling). The operation of producing optionally relies on at least one machine-trained resource that has been developed to serve plural functions, e.g., other than normalizing text. The method then includes developing (e.g., 610) the model based, at least in part, on the normalized reference transcription and/or the normalized ASR output results.

The method achieves at some of the technical benefits described in Section A. For example, the use of at least one general-purpose machine-trained resource to assist in normalizing text increases the efficiency by which the method performs its functions. This is because a developer is freed from the labor-intensive, time-intensive, and error-prone process of developing a custom machine-trained resource that is specifically designed to normalize text. Further, the method can produce a resource-efficient and accurate language model by using the normalized text provided by the method.

(A2) According to some implementations of the method of A1, the method further includes generating a word error rate (WER) measure by comparing the normalized reference transcription with the normalized ASR output results. The model is developed, in part, based on guidance provided by the WER measure.

(A3) According to some implementations of the method of any of A1 and A2, the original reference term and/or the original ASR term is a compound term, and wherein the operation of producing includes, for each compound term that is identified: using a segmentation algorithm to convert the compound term into a combination of at least a first sub-term and a second sub-term; applying at least one validity test to determine whether it is appropriate to split the compound term into the combination of the first sub-term and the second sub-term; and storing an entry in a substitution data store that indicates that it is appropriate to split the compound term into the combination of the first sub-term and the second sub-term.

(A4) According to some implementations of the method of A3, one validity test involves: identifying a pronunciation of the compound term using a pronunciation resource; identifying pronunciations of the first sub-term and the second sub-term using the pronunciation resource, and combining the pronunciations together to form a combined pronunciation; and determining whether the compound term has a same pronunciation as the combined pronunciation of the first sub-term and the second sub-term.

(A5) According to some implementations of the method of any of A3 and A4, one validity test involves: identifying a translation of the compound term from a given natural language to another natural language, using a translation resource; identifying a translation of a phrase formed by the first sub-term followed by the second sub-term with a separation there between, using the translation resource; and determining whether the compound term has a same translation as the translation of the phrase.

(A6) According to some implementations of the method of any of A3-A5, one validity test involves determining whether segmentation of the compound term into the first sub-term and the second sub-term satisfies a language-specific rule.

(A7) According to some implementations of the method of A6, one language-specific rule specifies that no sub-term can begin with a specified character.

(A8) According to some implementations of the method of any of A3-A7, the operation of producing further includes, based on the entry in the substitution data store, replacing each occurrence of the combination of the first sub-term and the second sub-term in the original reference transcription and the original ASR output results with the compound term.

(A9) According to some implementations of the method of any of A1 and A2, the operation of producing includes: applying plural conversion processes to the original reference term and the original ASR term, to produce plural conversion results; and determining that the original reference term is a valid variant of the original ASR term because the plural conversion results satisfy a prescribed test.

(A10) According to some implementations of the method of A9, one conversion process involves: translating the original reference term from a given natural language into another natural language using a translation resource; and translating the original ASR term from the original natural language into the other natural language using the translation resource. A determination that the original reference term and the original ASR term have a same translation constitutes evidence that the original reference term is a valid variant of the original ASR term.

(A11) According to some implementations of the method of any of A9 and A10, one conversion process involves: converting the original reference term into a transliterated counterpart of the original reference term using a transliteration resource; and converting the original ASR term into a transliterated counterpart of the original ASR term using the transliteration resource. A determination that the original reference term and the original ASR term have a same transliteration constitutes evidence that the original reference term is a valid variant of the original ASR term.

(A12) According to some implementations of the method of any of A9-A11, one conversion process involves: determining a pronunciation of the original reference term using a pronunciation resource; and determining a pronunciation of the original ASR term using the pronunciation resource. A determination that the original reference term and the original ASR term have a same pronunciation constitutes evidence that the original reference term is a valid variant of the original ASR term.

(A13) According to some implementations of the method of any of A9-A12, the operation of producing further includes forming at least one group of terms, the terms in the group being considered valid variants of each other, the group including at least the original reference term and the original ASR term.

(A14) According to some implementations of the method of A13, the operation of producing further includes: selecting a representative term from the group; and for each identified term in the original reference transcription and the original ASR output results that matches a member of the group other than the representative term, replacing the identified term with the representative term.

(A15) According to some implementations of the method of A14, the operation of selecting chooses a term of the group that has highest frequency of use.

(B1) According to a second aspect, some implementations of the technology described herein include a computer-implemented method (e.g., the process 702) for improving a computer-implemented automatic speech recognition (ASR) application. The method includes: obtaining (e.g., 704) a sample utterance and an original reference transcription of the sample utterance; converting (e.g., 706) the sample utterance to original automatic speech recognition (ASR) output results using an ASR process; using (e.g., 708) a segmentation algorithm to convert at least one compound term that appears in the original reference transcription and/or the original ASR output results into a combination of at least a first sub-term and a second sub-term; using (e.g., 710) at least one validity test to determine that it is appropriate to split the compound term into the combination of the first sub-term and the second sub-term; replacing (e.g., 712) each occurrence of the combination of the first sub-term and the second sub-term in the original reference transcription and the original ASR output results with the compound term, to produce a normalized reference transcription and normalized ASR output results; and using (e.g., 714) the normalized reference transcription and/or the normalized ASR output results to improve performance a computer-implemented ASR application. One computer-implemented ASR application is the generation of a language model (e.g., 314) for the ASR system 302. The operation of using at least one validity test relies on at least one machine-trained resource that has been developed to serve plural functions, e.g., other than normalizing text. The method achieves at some of the technical benefits described above for the method of A1.

(C1) According to a third aspect, some implementations of the technology described herein include another computer-implemented method (e.g., the process 802) for normalizing text. The method includes: obtaining (e.g., 804) a sample utterance and an original reference transcription of the sample utterance; converting (e.g., 806) the sample utterance to original automatic speech recognition (ASR) output results using an ASR process; applying (e.g., 808) plural conversion processes to each original reference term in the original reference transcription, and to each original ASR term in the original ASR output results, to produce plural conversion results; identifying (e.g., 810) at least one group of terms that are considered valid variants of each other, based on the plural conversion results; selecting (e.g., 812) a representative term from the group; and, for each identified term in the original reference transcription and the original ASR output results that matches a member of the group other than the representative term, replacing (e.g., 902 of FIG. 9) the identified term with the representative term, the operation of replacing producing a normalized reference transcription and normalized ASR output results. The operation of applying relies on at least one machine-trained resource that has been developed to serve plural functions, e.g., other than normalizing text. The method further includes using (e.g., 904) the normalized reference transcription and/or the normalized ASR output results to improve performance a computer-implemented ASR application. One computer-implemented ASR application is the generation of a language model (e.g., 314) for the ASR system 302. The method achieves at some of the technical benefits described above for the method of A1.

In yet another aspect, some implementations of the technology described herein include a computing system (e.g., computing system 1102) that includes hardware logic circuitry (e.g., 1114) that is configured to perform any of the methods described herein (e.g., any individual method selected from A1-A15, B1, and C1).

In yet another aspect, some implementations of the technology described herein include a computer-readable storage medium (e.g., 1106) for storing computer-readable instructions (e.g., 1108). The computer-readable instructions, when executed by one or more hardware processors (e.g., 1104), perform any of the methods described herein (e.g., any individual method selected from A1-A15, B1, and C1).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1114 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for developing a model used in an automatic speech recognition (ASR) system, comprising:
    obtaining a sample utterance and an original reference transcription of the sample utterance, for use in developing the model;
    converting the sample utterance to original ASR output results using the ASR system, the original reference transcription having at least one original reference term that is considered to be a valid variant of a corresponding original ASR term in the original ASR output results, and wherein the original reference term has a different textual form than the original ASR term;
    producing a normalized reference transcription and normalized ASR output results, the normalized reference transcription having a normalized reference term that is a counterpart of the original reference term, and the normalized ASR output results having a normalized ASR term that is a counterpart of the original ASR term, the normalized reference term having a same textual form as the normalized ASR term, said producing relying on at least one machine-trained resource that has been developed to serve plural functions; and developing the model based, at least in part, on the normalized reference transcription and/or the normalized ASR output results, the original reference term and/or the original ASR term being a compound term, and said producing comprising, for each compound term that is identified:

using a segmentation algorithm to convert the compound term into a combination of at least a first sub-term and a second sub-term;

applying at least one validity test to determine whether it is appropriate to split the compound term into the combination of the first sub-term and the second sub-term; and storing an entry in a substitution data store that indicates that it is appropriate to split the compound term into the combination of the first sub-term and the second sub-term.

2. The computer-implemented method of claim 1, wherein the method further includes generating a word error rate (WER) measure by comparing the normalized reference transcription with the normalized ASR output results, and wherein the model is developed, in part, based on guidance provided by the WER measure.

3. The computer-implemented method of claim 1, wherein one validity test involves:

identifying a pronunciation of the compound term using a pronunciation resource;

identifying pronunciations of the first sub-term and the second sub-term using the pronunciation resource, and combining the pronunciations together to form a combined pronunciation; and determining whether the compound term has a same pronunciation as the combined pronunciation of the first sub-term and the second sub-term.

4. The computer-implemented method of claim 1, wherein one validity test involves:

identifying a translation of the compound term from a given natural language to another natural language, using a translation resource;

identifying a translation of a phrase formed by the first sub-term followed by the second sub-term with a separation therebetween, using the translation resource; and determining whether the compound term has a same translation as the translation of the phrase.

5. The computer-implemented method of claim 1, wherein one validity test involves determining whether segmentation of the compound term into the first sub-term and the second sub-term satisfies a language-specific rule.

6. The computer-implemented method of claim 5, wherein one language-specific rule specifies that no sub-term can begin with a specified character.

7. The computer-implemented method of claim 5, wherein said producing further comprises, based on the entry in the substitution data store, replacing each occurrence of the combination of the first sub-term and the second sub-term in the original reference transcription and the original ASR output results with the compound term.

8. A computer-implemented method for developing a model used in an automatic speech recognition (ASR) system, comprising:

obtaining a sample utterance and an original reference transcription of the sample utterance, for use in developing the model;

converting the sample utterance to original ASR output results using the ASR system, the original reference transcription having at least one original reference term that is considered to be a valid variant of a corresponding original ASR term in the original ASR output results, and wherein the original reference term has a different textual form than the original ASR term;

producing a normalized reference transcription and normalized ASR output results, the normalized reference transcription having a normalized reference term that is a counterpart of the original reference term, and the normalized ASR output results having a normalized ASR term that is a counterpart of the original ASR term, the normalized reference term having a same textual form as the normalized ASR term, said producing relying on at least one machine-trained resource that has been developed to serve plural functions; and developing the model based, at least in part, on the normalized reference transcription and/or the normalized ASR output results, said producing comprising:

applying plural conversion processes to the original reference term and the original ASR term, to produce plural conversion results;

determining that the original reference term is a valid variant of the original ASR term because the plural conversion results satisfy a prescribed test; and forming at least one group of terms, based on the plural conversion results, the terms in the group being considered valid variants of each other, the group including at least the original reference term and the original ASR term.

9. The computer-implemented method of claim 8, wherein one conversion process involves:

translating the original reference term from a given natural language into another natural language using a translation resource; and translating the original ASR term from the original natural language into the other natural language using the translation resource, wherein a determination that the original reference term and the original ASR term have a same translation constitutes evidence that the original reference term is a valid variant of the original ASR term.

10. The computer-implemented method of claim 8, wherein one conversion process involves:

converting the original reference term into a transliterated counterpart of the original reference term using a transliteration resource; and converting the original ASR term into a transliterated counterpart of the original ASR term using the transliteration resource, wherein a determination that the original reference term and the original ASR term have a same transliteration constitutes evidence that the original reference term is a valid variant of the original ASR term.

11. The computer-implemented method of claim 8, wherein one conversion process involves:

determining a pronunciation of the original reference term using a pronunciation resource; and determining a pronunciation of the original ASR term using the pronunciation resource, wherein a determination that the original reference term and the original ASR term have a same pronunciation constitutes evidence that the original reference term is a valid variant of the original ASR term.

12. The computer-implemented method of claim 8, wherein said producing further comprises:
selecting a representative term from the group; and
for each identified term in the original reference transcription and the original ASR output results that matches a member of the group other than the representative term, replacing the identified term with the representative term.

13. The computer-implemented method of claim 12, wherein said selecting chooses a term of the group that has highest frequency of use.

14. A computing system for improving a computer-implemented automatic speech recognition (ASR) application, comprising:
hardware logic circuitry for performing operations, the hardware logic circuitry corresponding to: (a) one or more hardware processors that execute machine-readable instructions stored in a memory, and/or (b) one or more other hardware logic units that include a collection of logic gates, the operations including:
obtaining a sample utterance and an original reference transcription of the sample utterance;
converting the sample utterance to original (ASR) output results using an ASR process;
using a segmentation algorithm to convert at least one compound term that appears in the original reference transcription and/or the original ASR output results into a combination of at least a first sub-term and a second sub-term;
using at least one validity test to determine that it is appropriate to split the compound term into the combination of the first sub-term and the second sub-term, said using at least one validity test relying on at least one machine-trained resource that has been developed to serve plural functions;
replacing each occurrence of the combination of the first sub-term and the second sub-term in the original reference transcription and the original ASR output results with the compound term, to produce a normalized reference transcription and normalized ASR output results; and
using the normalized reference transcription and/or the normalized ASR output results to improve performance of the computer-implemented ASR application.

15. The computing system of claim 14,
wherein a first validity test involves: identifying a pronunciation of the compound term using a pronunciation resource; identifying pronunciations of the first sub-term and the second sub-term using the pronunciation resource, and combining the pronunciations together to form a combined pronunciation; and determining whether the compound term has a same pronunciation as the combined pronunciation of the first sub-term and the second sub-term,
wherein a second validity test involves: identifying a translation of the compound term from a given natural language to another natural language, using a translation resource; identifying a translation of a phrase formed by the first sub-term followed by the second sub-term with a separation therebetween, using the translation resource; and determining whether the compound term has a same translation as the translation of the phrase, and
wherein a third validity test involves determining whether segmentation of the compound term into the first sub-term and the second sub-term satisfies a language-specific rule.

16. A computer-readable storage medium for storing computer-readable instructions, the computer-readable instructions, when executed by one or more hardware processors, performing a method that comprises:
obtaining a sample utterance and an original reference transcription of the sample utterance;
converting the sample utterance to original automatic speech recognition (ASR) output results using an ASR process;
applying plural conversion processes to each original reference term in the original reference transcription, and to each original ASR term in the original ASR output results, to produce plural conversion results, said applying relying on at least one machine-trained resource that has been developed to serve plural functions;
identifying at least one group of terms that are considered valid variants of each other, based on the plural conversion results;
selecting a representative term from the group;
for each identified term in the original reference transcription and the original ASR output results that matches a member of the group other than the representative term, replacing the identified term with the representative term, said replacing producing a normalized reference transcription and normalized ASR output results; and
using the normalized reference transcription and/or the normalized ASR output results to improve performance of a computer-implemented ASR application,
the computer-readable storage medium excluding propagated signals in transit.

17. The computer-readable storage medium of claim 16, wherein a first conversion process translates a particular term from one natural language to another natural language, a second conversion process identifies a pronunciation of the particular term, and a third conversion process identifies a transliteration of the particular term.

18. The computer-readable storage medium of claim 16, wherein said selecting chooses a term of the group that has highest frequency of use.

* * * * *